K. R. J. LAGUS.
PORTABLE MOTOR SAW FOR FELLING TREES, CUTTING LOGS, AND SAWING WOOD.
APPLICATION FILED SEPT. 28, 1917.
1,378,963. Patented May 24, 1921.
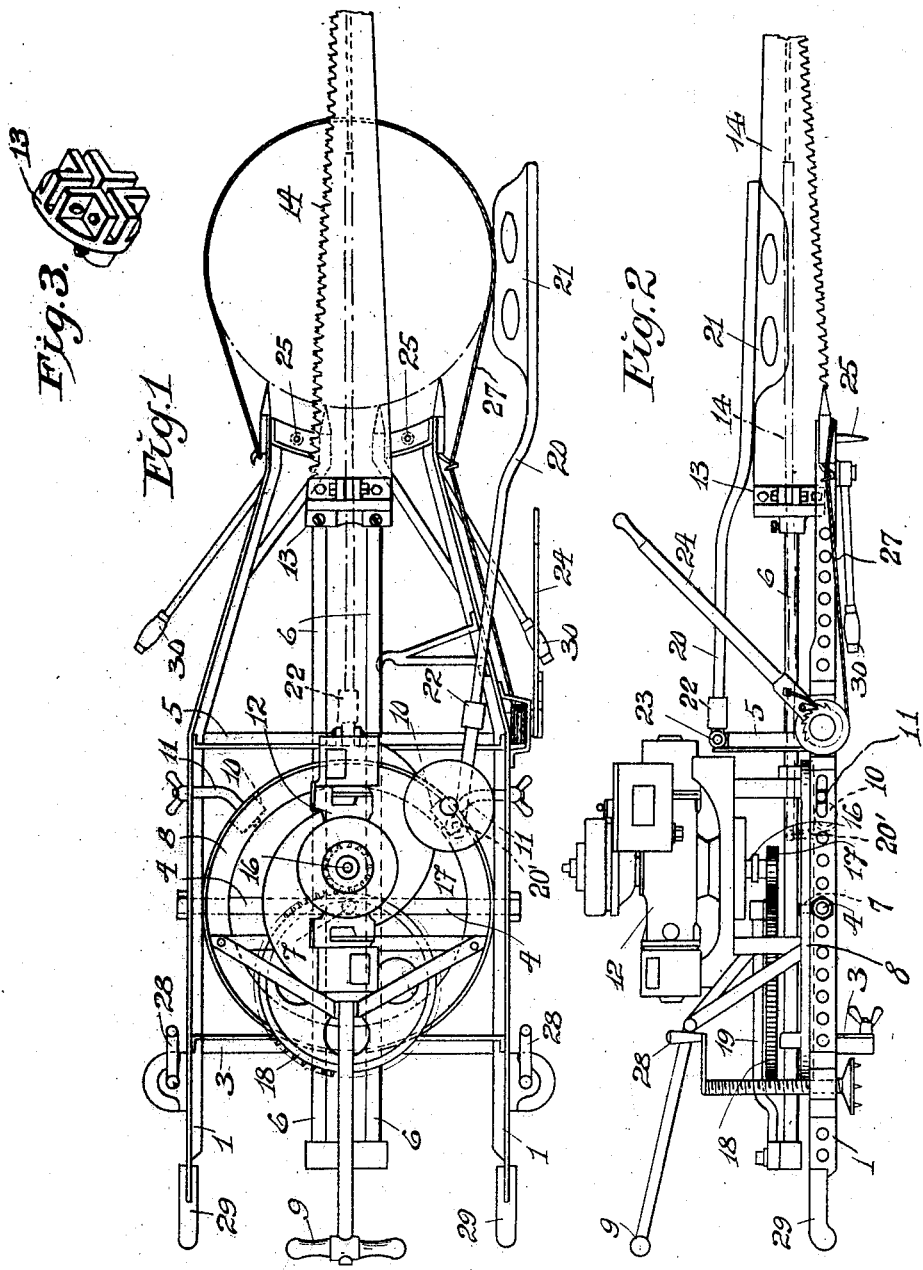

UNITED STATES PATENT OFFICE.

KNUT ROBERT JOHAN LAGUS, OF ÅBO, FINLAND.

PORTABLE MOTOR-SAW FOR FELLING TREES, CUTTING LOGS, AND SAWING WOOD.

1,378,963.     Specification of Letters Patent.     Patented May 24, 1921.

Application filed September 28, 1917. Serial No. 193,629.

*To all whom it may concern:*

Be it known that I, KNUT ROBERT JOHAN LAGUS, a citizen of Finland, and resident of Slottsgatan 30, Åbo, Finland, have invented certain new and useful Improvements in Portable Motor-Saws for Felling Trees, Cutting Logs, and Sawing Wood, of which the following is a specification, reference being had therein to the accompanying drawing.

This invention relates to a portable motor-saw, which, as required, may be used for felling trees, cutting logs as well as sawing wood. The said motor-saw comprises a horizontal ring, disk or the like rotatably mounted on a barrow or the like, which ring, etc., carries a suitable motor and one or two sliding rods, which are reciprocated by the motor through a suitable motion transmitting device and carrying a saw-blade. Besides the said motor-saw is provided with a rod, which guides the saw-blade while it cuts into the tree, and with a chain, wire rope or the like fixed in a special manner and adapted to firmly connect the motor-saw with the tree, and with two adjusting screws for bringing the motor-saw in a horizontal position.

Figure 1 of the accompanying drawing is a plan view of the motor-saw adapted for tree-felling, and showing in dotted lines the position of the saw when used for sawing logs as shown in full lines in Fig. 2. Fig. 2 is a side view of the motor-saw, adapted for cutting logs or sawing wood, and showing in dotted lines the position of the saw when used for felling trees. Fig. 3 is a perspective view of the crosshead for supporting the saw in either a horizontal or vertical position.

The motor-saw consists of a barrow, comprising side bars 1 and cross bars 3, 4 and 5 connecting the same. The cross bars 3 and 5 are bent downward and upward respectively into curves in order not to prevent the rods 6, sliding in bearings, from moving during the cutting operation. The cross bar 4 is journaled in the side bars 1 and has a vertical pin 7, on which a ring 8, disk or the like is mounted in a rotatable manner. The said ring 8 is provided with a handle 9, by means of which the ring can be rotated manually in a horizontal direction around the pin 7 and in a vertical direction on the rod 4. As the ring is rotated in a horizontal direction, it is supported by rollers 10, provided on arms 11, which are fixed to the side bars of the barrow by means of winged nuts. When the ring is to be swung vertically, the said arms 11 together with the rollers are moved laterally out of the path of the ring.

On the ring 8 a suitable motor 12 is fixed, in the present case an internal combustion engine cooled by air. Two rods 6 are mounted in a slidable manner in bearings provided on the ring 8, which at their fore ends are connected by a cross-head 13, in which a saw-blade 14 may be fixed in either a horizontal or a vertical position.

The shaft 16 of the motor actuates by means of a gearing 17, 18 and a pitman 19 the sliding rods 6 carrying the saw-blade and reciprocates the same.

A rod 20 is mounted in a swingable manner on a vertical pin provided on the ring 8, the fore end 21 of which rod is groove-shaped and guides the rear edge of the saw-blade, while the blade starts its cutting into the tree, during the felling operation. The said rod 20 is acted upon by a spring in such direction, that the end 21 always is forced against the saw-blade and guides the same, while it cuts into the tree. After the saw-blade has cut into the tree for the greater part of its width it leaves the guide 20, 21, which then is forced by the spring against the side of the tree and the remaining stub. When the saw is to be used for cutting logs, in which case the saw-blade operates in vertical direction, the saw-blade is first mounted in a vertical position. The guide-rod 20, 21 is removed at the screw-socket joint 22 and is connected by means of a pin with a fork 23, fixed to the cross-bar 5. The guide rod 20, 21 now actuates the saw-blade, acted upon by a spring, as stated above, or by its own weight.

The fore end of the barrow is so arranged, that it can be connected with the tree to be felled. In the form of the invention shown in the drawing the barrow is fixed to the tree during the felling operation by means of a wire rope or a chain which is laid around the tree and one end of which is fixed to a hook. The tension of the said rope, etc., is increased by means of a device arranged like an ordinary ratchet-brace 24.

When the motor-saw is used for cutting logs the fore end of the barrow is located on the log and the spikes 25 forced into the same. The said spikes are easily disengaged, when the barrow is to be moved.

The rear part of the barrow is raised or lowered by means of adjusting screws provided with crank handles 28. The entire structure may be lifted by means of the fixed handles 29 and the fore movable handles 30.

For the felling of a tree the barrow is connected with the same as near the ground as possible, whereafter the barrow is adjusted into a horizontal position by means of the screws operated by the cranks 28. The motor is then started and the saw-blade is forced against the tree by rotating the ring 8 horizontally by means of the handle 9. As the motor-saw should be used for cutting logs, the barrow is fixed to the log by means of the spikes 25, as stated above. The motor is then started and the saw-blade forced against the log by swinging the ring 8 vertically on the cross bar 4 by raising the handle 9.

Having now described my invention, what I claim as new and desire to secure by Letters Patent is:

1. In a motor saw, the combination of a portable frame, a horizontal ring, disk or the like, mounted in said frame for rotary and horizontally tilting movements, a motor carried by said ring, a rod slidingly mounted on said ring, means for fixing a saw-blade to said rod in either a vertical or horizontal position, arms fixed to said frame, and rollers journaled on said arms for supporting said ring during the tree felling operation, said arms being movable to clear the ring and permit the vertical tilting of said ring.

2. A motor saw comprising a frame, a horizontally disposed bar journaled in the frame, a pin formed on said bar, a wheel journaled on said pin whereby said wheel is capable of rotary movement in a horizontal plane and a tilting movement transversely to the rotary movement, means adjustably mounted in said frame for rotatably supporting said wheel and for preventing tilting movement thereof, and a saw blade guide member mounted for reciprocating movement on said wheel.

3. A motor saw comprising a frame, a shaft journaled horizontally in said frame and adjustable longitudinally thereof, a pin, extending at right angles from said shaft, a wheel journaled on said pin, means for rotatably supporting said wheel and for preventing horizontal tilting movement thereof, rods mounted for reciprocating movement on said wheel, a saw-blade adjustably mounted on said rods, means for reciprocating said rods, and a saw guiding member adjustable on said frame and biased to a predetermined position.

KNUT ROBERT JOHAN LAGUS.